Oct. 21, 1947.  A. BOYNTON  2,429,546
VALVELESS PRESSURE REGULATOR
Filed Feb. 23, 1943  2 Sheets-Sheet 1

ALEXANDER BOYNTON,
INVENTOR,

BY
Albert E. Dieterich
ATTORNEY.

Oct. 21, 1947.  A. BOYNTON  2,429,546
VALVELESS PRESSURE REGULATOR
Filed Feb. 23, 1943  2 Sheets-Sheet 2

ALEXANDER BOYNTON,
INVENTOR,

BY
Albert E. Dieterich
ATTORNEY.

Patented Oct. 21, 1947

2,429,546

UNITED STATES PATENT OFFICE 2,429,546

VALVELESS PRESSURE REGULATOR

Alexander Boynton, San Antonio, Tex.; Sida S. Martin executrix of said Alexander Boynton, deceased Application February 23, 1943, Serial No. 476,805

12 Claims. (Cl. 50—23)

This is a continuation in part of my copending application Serial No. 408,519, filed August 27, 1941 (Case 206) which issued as Patent No. 2,341,525 on February 15, 1944.

The principal object is to provide a pressure regulator which substitutes an elastic member only for the usual valve and valve seat employed to regulate the flow of pressure fluid.

Another object is to reduce pressure fluid of a relatively high value to a predetermined lesser value by means of a diaphragm assembly employed as the only movable element.

Another object is to employ pressure fluid of a relatively low and variable value in a pipeline to cut off the flow of pressure fluid of a higher value through the line.

A further object resides in the employment of nonmetallic means for the purpose of reducing relatively high pressures to predetermined lesser values.

A still further object is to provide a pressure regulator of fewer parts, greater compactness, and more economical construction than any similar means heretofore devised within the knowledge of this applicant.

In carrying out the preferred and first modified embodiments of the invention, I employ a diaphragm and bellows assembly, the bellows being filled with an elastic substance having a passage through it adapted to be closed when the diaphragm is flexed in one direction and compresses the bellows. In the second modified construction, the bellows is replaced by two telescoping tubular members filled with an elastic substance having a passage through it adapted to be closed when the diaphragm is flexed and further telescopes the telescoping members; all of which will appear more fully from the following specification and the accompanying drawing, in which—

Similar characters of reference are employed to designate similar parts throughout the several views.

Figure 1:
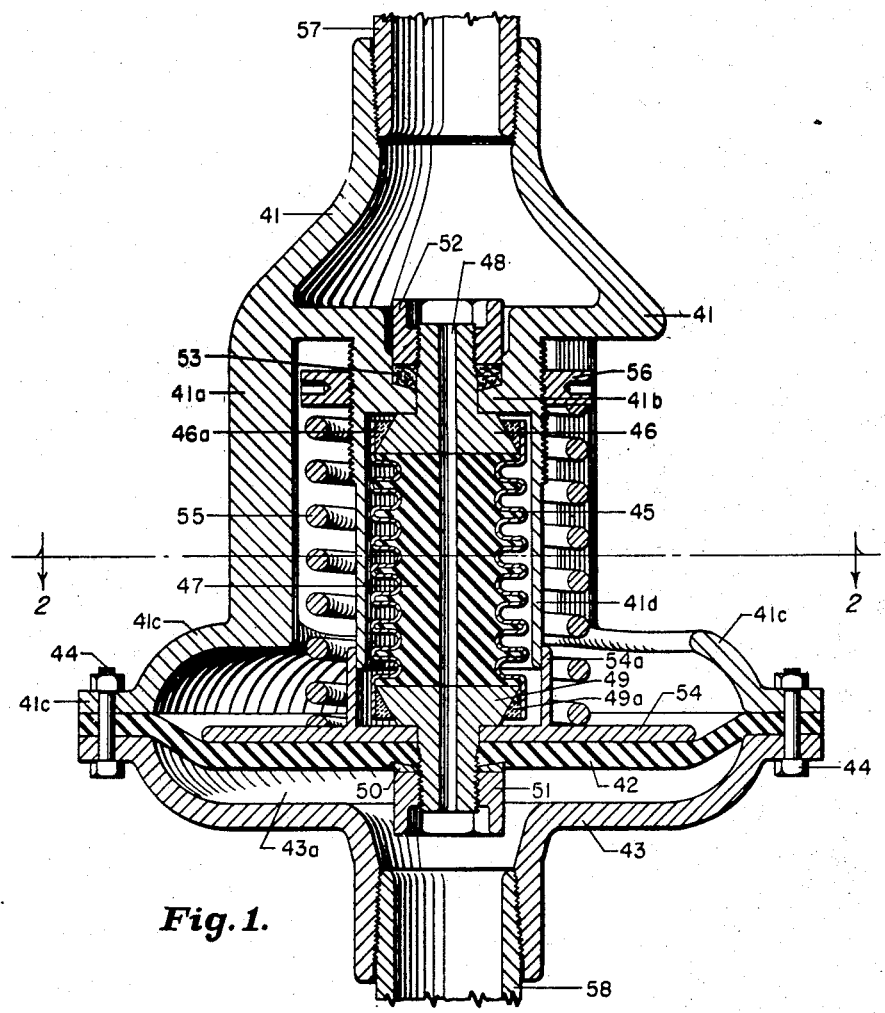
Fig. 1 is a longitudinal section through the preferred construction.
Figure 2:
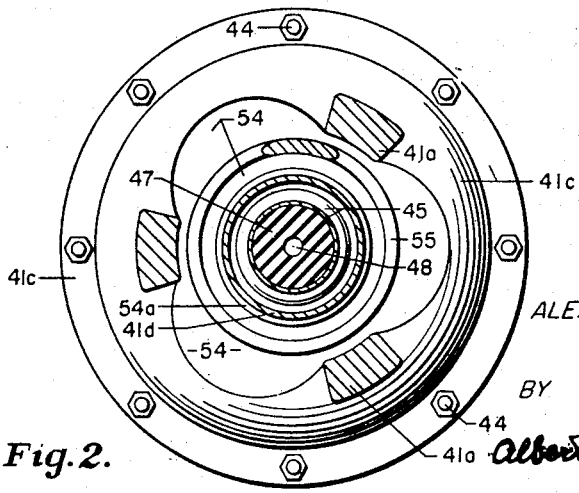
Fig. 2 is a cross section on the line 2—2, Fig. 1.

In Fig. 1, wherein the direction of fluid flow through the regulator is indicated by the arrows, the diaphragm 42, which may be metallic or of rubberized fabric or the like, is clamped hermetically between the external flange 41c of the shell 41 and the cap member 43 by the bolts 44. The diaphragm supports plate 54 is urged to flex the diaphragm outward or downstream by force of the diaphragm support spring 55 which may have its force variably adjusted by the adjusting ring 56, having threaded connection over the internal upstream tubular extension 41d of the shell 41.

The bellows 45, which preferably should be metallic, is shown to have slight clearance within the upstream tubular extension 41d of the shell 41 and is secured upon the bellows downstream end connection 49 by the solder or weld 49a. This bellows contains the elastic filler 47, which may be of rubber or the like. The upstream end of the bellows 45 has the upstream connection 46 secured upon it by the solder or weld 46a. The latter connection is engaged upon the internal flange 41b of the shell 41 by the hollow-headed gland nut 52, which is threadedly connected over the tubular extension of the bellows upstream end connection 46 and compresses the packing 53 against the internal flange 41b. Manifestly any other laterally unyieldable and longitudinally compressible means may be substituted for said bellows as a housing for the elastic filler 47.

The bellows downstream end connection 49, secured within the bellows 45 by the solder or weld 49a, has a downstream tubular extension which is received closely through the central portion of the diaphragm support plate 54 and the diaphragm 42, the washer 50 being urged upon the diaphragm, and the diaphragm, in turn, being urged upon the plate 54 engaged upon the connection 49 by the hollow-headed securing nut 51, which has clearance with the cap member 43.

The diaphragm support plate 54 has the upstream tubular extension 54a slidable over the tubular extension 41d of the shell 41.

The passage 48, extending axially through the members 46, 47, and 49 provides communication between the high pressure conduit 57, secured to the shell 41, and the low pressure conduit 58, secured upon the cap member 43.

The upstream side of the diaphragm is exposed at all times to atmospheric pressure contacting it through the open, cored out or cutaway portion between the external flange 41c and the connecting arms 41a of the shell 41. The downstream side of the diaphragm is exposed at all times to the low pressure fluid in the low pressure conduit 58, which low pressure fluid is also constantly present within the chamber 43a formed between the diaphragm and the cap 43. The clearance between the hollow-headed nut 51 and the cap member 43 provides communication between said chamber and the conduit 58.

Obviously the shell 41 may be considered as a portion of the high pressure conduit 57. Likewise the cap member 43 may be considered as a continuing part of the low pressure conduit 58.

Operation of Fig. 1

When fluid under pressure from the high pressure conduit 57 flows into the low pressure conduit 58 via the passage 48, fluid from the low pressure line entering the chamber 43a will flex the diaphragm 42 inward or upstream, thereby compressing the elastic filler 47 so as to gradually restrict the passage 48 through the filler, and finally to close this passage at a predetermined pressure of fluid within the low pressure conduit 58.

Manifestly, the force in the chamber 43a required to flex the diaphragm upstream far enough to close the passage 48 may be regulated by further compressing or by releasing the diaphragm support spring 55, which regulation may be accomplished by screwing the adjusting ring 56 in the direction of the diaphragm or away from it. Further compressing the spring 55, which is guided externally by the connecting arms 41a, will increase the low pressure in the conduit 58, and releasing the spring will decrease this pressure, as is apparent.

Figure 3:
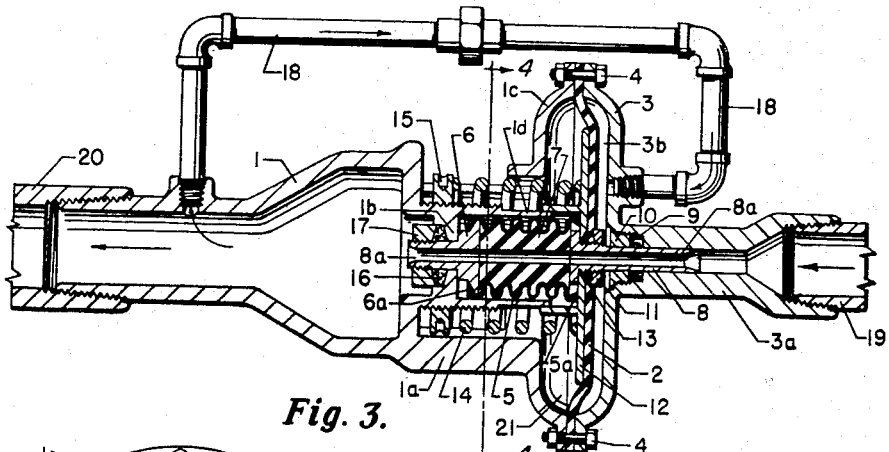
Fig. 3 is mainly a longitudinal section through the first modified embodiment.
Figure 4:
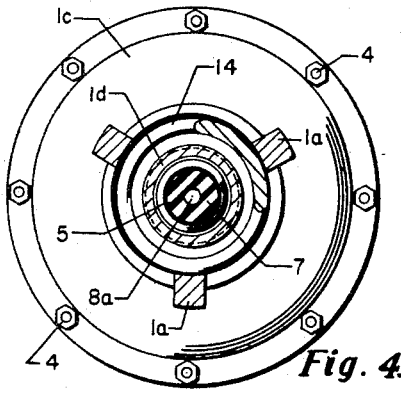
Fig. 4 is a cross section on the line 4—4, Fig. 3.
Figure 5:
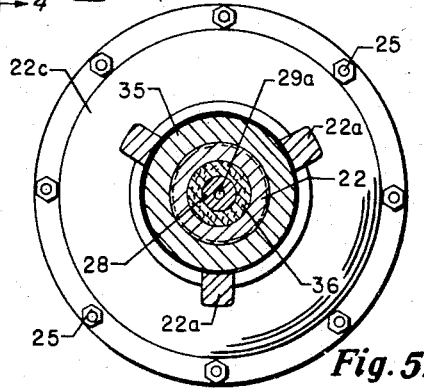
Fig. 5 is a cross section on the line 5—5, Fig. 6.

In Fig. 3, wherein the direction of fluid flow through the regulator is indicated by the arrows, the diaphragm 2, which may be metallic or of rubberized fabric, is clamped hermetically between the external flange 1c of the shell 1 and the cap member 3 by the bolts 4. The diaphragm support plate 12 is urged to flex the diaphragm outward by force of the diaphragm support spring 14 which may have its force adjusted by the adjusting ring 15, having threaded connection over the internal upstream tubular extension 1d of the shell 1.

The bellows 5, which may be metallic, is shown to have slight clearance within the upstream tubular extension 1d of the shell 1 and is secured upon the plate 12 by the solder or weld 5a and contains the elastic filler 7, which may be of rubber or the like. The inner or downstream end of this bellows has the connection 6 secured upon it by the solder or weld 6a and is engaged upon the internal flange 1b of the shell 1 by the gland nut 17 which is threadedly connected over the tubular extension of the bellows inner end connection 6 and compresses the packing 16 against the internal flange 1b. Manifestly any other laterally unyieldable and longitudinally compressible means may be substituted for said bellows. The tubular member 8, which is slidable closely within the tubular extension 3a of the cap member 3, has a circular flange-like enlargement within the bellows and abutting the elastic filler 7. This enlargement is clamped against the diaphragm support plate 12 by the clamp ring 11 threadedly engaged upon the tubular member 8 and screwed down firmly upon the diaphragm. The plate 12 has a downstream tubular extension slidable over the upstream tubular extension 1d of the shell 1. The tubular member 8 and the plate 12 may be secured together further by the solder or weld 13. The U-cup 9, which may be of leather, fabric or the like, is fitted closely over the tubular member 8 and is secured within the extension 3a of the cap member 3 by the U-cup retainer ring 10 for the purpose of preventing leakage of fluid out of the high pressure conduit 19 into the chamber 3b formed between the cap member 3 and the diaphragm 2.

The passage 8a, extending axially through the members 6, 7, and 8, provides communication between the high pressure conduit 19, secured to the extension 3a of the cap member 3, and the low pressure conduit 20, secured upon the shell 1.

The actuating pressure fluid tube 18 provides communication between the low pressure conduit 20 and the otherwise closed chamber 3b confronting the outer or upstream side of the diaphragm, as is apparent. The clamp ring 11 engages upon the U-cup retainer ring 10 while the diaphragm is in its normal distended position responsive to the expansive force of the diaphragm support spring 14. The downstream side of the diaphragm is exposed at all times to atmospheric pressure in the opening 21.

Obviously the cap member 3 may be considered as a portion of the high pressure conduit 19. Likewise the shell 1 may be considered as a continuing part of the low pressure conduit 20.

Operation of Fig. 3

When fluid under pressure from the high pressure conduit 19 flows into the low pressure conduit 20 via the passage 8a, fluid from the low pressure line will enter the chamber 3b via the actuating pressure fluid tube 18 and flex the diaphragm 2 inward or downstream, thereby compressing the elastic filler 7 so as to gradually restrict the passage 8a through the filler and finally to close this passage at a predetermined pressure of fluid within the low pressure conduit 20.

Manifestly, the force in the chamber 3b required to flex the diaphragm downstream or into the opening 21 far enough to close the passage 8a may be regulated by further compressing or by releasing the diaphragm support spring 14. Such regulation may be accomplished by screwing the adjusting ring 15 in the direction of the diaphragm or away from it. Further compressing the spring 14, which is guided externally by the connecting arms 1a, will increase the low pressure in the conduit 20, and releasing the spring will decrease this pressure, as is apparent.

Figure 6:
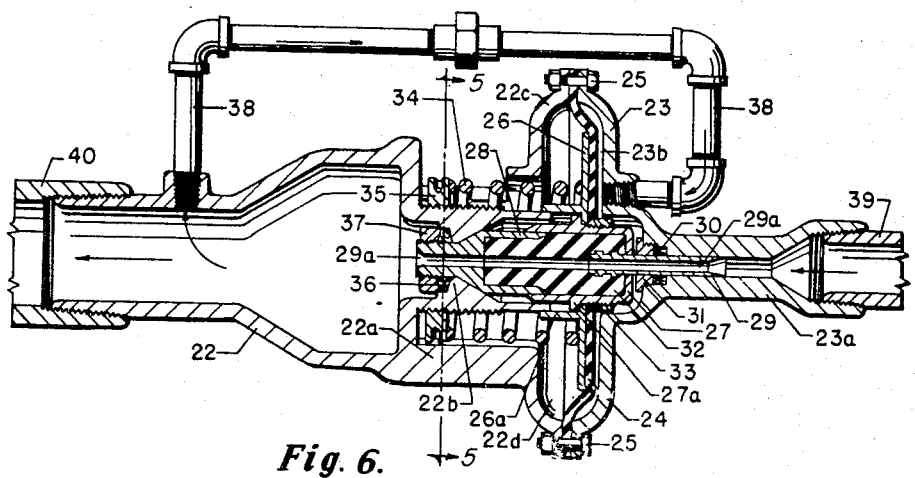
Fig. 6 is mainly a longitudinal section through the second modified construction.

Referring to Fig. 6 illustrating the second modified construction, it will be noted that the principal difference from the first modified construction is in the form of the elastic member, the telescopic housing means for same, and the manner of securing the housing means upon the diaphragm.

The diaphragm 24, which may be metallic or of rubberized fabric, is clamped hermetically between the external flange 22c of the shell 22 and the cap member 23 by the bolts 25. The diaphragm support plate 26, having the tubular extension 26a slidable over an axial internal tubular projection of the shell, is engaged with and is adapted to distend the diaphragm upstream by force of the diaphragm support spring 34 which may have its compression adjusted by the adjusting ring 35 having threaded engagement over the base of said internal projection of the shell.

The elastic filler 32 is fitted closely into the sleeve 28 and the hood 27 having the external flange 27a secured upon the plate 26 by the clamp ring 33, which ring is threadedly connected around the hood 27 and screwed firmly upon the diaphragm in order to provide a secure assembled relation between the diaphragm and the elastic filler 32. The sleeve 28 engages upon the internal restricted portion 22b of the shell 22 where it is clamped hermetically upon this restricted portion by the gland nut 37 having threaded connection over the downstream tubular extension of the sleeve 28 and compressing the packing 36 against said restricted portion.

The tubular member 29 has its upstream end slidable closely within the tubular extension 23a of the cap member 23 and has the other end secured within the elastic filler 32. The leather or fabric U-cup 30, closely engaged around the tubular member 29, is secured within the tubular extension 23a by the U-cup retainer ring 31 which may have slight clearance with the hood 27. This U-cup, which may be replaced by packing, obviously is adapted to prevent leakage out of the high pressure conduit 39 into the chamber 23b.

The passage 29a, extending axially through the members 26, 29, and 32 provides communication between the high pressure conduit 39 connected to the extension 23a, and the low pressure conduit 40 connected to the shell 22.

The actuating pressure fluid tube 38 provides a communication means for fluid between the low pressure conduit 40 and the chamber 23b formed between the cap member 23 and the diaphragm 24. The opening 22d confronting the low pressure or downstream side of the diaphragm exposes this side of the diaphragm to atmospheric pressure, as is apparent.

The cap member 23 may be considered as part of the high pressure conduit 39 for the purpose of interpreting the appended claims. Likewise the shell 22 may be considered as part of the low pressure conduit 40.

Obviously the diaphragm support plate 12 in Fig. 3 and the corresponding plate 26 in Fig. 6 may be omitted without destroying the function of the diaphragms.

*Operation of Fig. 6*

Pressure fluid from the high pressure conduit 39 entering the low pressure conduit 40 via the passage 29a will exert pressure upon the diaphragm 24 via the actuating pressure fluid tube 38. When this pressure builds up to a predetermined value, the diaphragm will be flexed downstream or in the direction of the spring 34 and the low pressure conduit 40, thereby causing the hood 27 and the sleeve 28 to telescope further until, at a predetermined pressure within the chamber 23b, the passage 29a will be closed completely by the elastic filler 32 as the same is compressed longitudinally and forced thereby to flow or move into said passage.

The adjusting ring 35 may be turned to move toward the diaphragm compressing the spring 34 to increase the low pressure or it may be moved away from the diaphragm to decrease the low pressure, the spring 34 being guided externally in true alignment with the axis of the device by the connecting arms 22a of the shell. It is apparent, therefore, that each form of the device may be employed to reduce any high pressure to any relatively low pressure.

Those skilled in the art will know that the pressure regulator herein disclosed can be adapted easily by any mechanic of ordinary skill to form a flow device for wells by exposing the upstream side of the diaphragm to the pressure fluid employed to flow the well and exposing the downstream side of the diaphragm to the pressure of the upstanding column of well fluid in the eduction tubing. Such additional use of the invention is mentioned to illustrate the various possible adaptations of this invention.

The invention as herein illustrated and described is manifestly subject to many changes in construction and arrangement of parts which will remain within the scope and purpose of the stated objects and appended claims.

I claim:

1. In a pressure regulator: a high pressure conduit; a low pressure conduit; a shell connected to said high pressure conduit and having a downstream tubular extension; a cap member connected to said low pressure conduit; a diaphragm hermetically engaged between said shell and cap member and cooperating with said cap member to form a chamber on the downstream side of said diaphragm, said chamber having communication with said low pressure conduit, the upstream side of said diaphragm being exposed to atmosphere; a support plate upon the upstream side of said diaphragm, said plate having a tubular extension slidable relative to said downstream extension; a bellows within said downstream extension, said bellows being secured to said plate and diaphragm by an end connection, and another end connection between said bellows and said shell; an elastic filler within said bellows for controlling the flow of fluid through the regulator, said filler and said end connections of said bellows having a passage therethrough communicating between said high and low pressure conduits; and adjustable spring means for resiliently urging said diaphragm distended downstream into said chamber.

2. In a pressure regulator: a high pressure conduit; a low pressure conduit; a shell connected to said high pressure conduit; a cap member connected to said low pressure conduit; a diaphragm hermetically connected between said shell and cap member and cooperating with said cap member to form a chamber confronting the downstream side of said diaphragm, said chamber having communication with said low pressure conduit, the other side of said diaphragm being exposed to atmosphere; a bellows between said shell and diaphragm; means for hermetically securing one end of said bellows to said shell; means for hermetically securing the other end of said bellows to said diaphragm; an elastic filler within said bellows for controlling the flow of fluid, there being a passage through said filler and both said means for securing said bellows, said passage communicating between said high and low pressure conduits; and means for adjusting the force required to deflect said diaphragm far enough to compress said filler to close said passage.

3. In a pressure regulator: a high pressure conduit; a low pressure conduit; a shell having openings and connected to said low pressure conduit; said shell also having an upstream tubular extension; a cap member connected to said high pressure conduit; a diaphragm hermetically engaged between said shell and cap member and having one side exposed to atmospheric pressure through said openings, said diaphragm and said cap member forming a chamber on the other side of said diaphragm; a support plate upon the downstream side of said diaphragm, said plate having a tubular extension slidable over said upstream extension; a bellows within said upstream extension and hermetically secured to said plate, said bellows also having an end connection securing said bellows hermetically to said shell; an elastic filler within said bellows; a tubular member secured to said plate, said tubular member being slidable hermetically in said cap member, said tubular member, filler, and said end connection having a continuous opening therethrough; spring means for normally distending said diaphragm upstream and into said chamber; and an actuating pressure fluid tube connecting said shell and said chamber, said tube transmitting pressure from said low pressure conduit to said chamber to actuate said diaphragm in compressing said filler and restricting the passage therethrough.

4. In a pressure regulator: a high and a low pressure conduit; a shell joining said conduits; a diaphragm hermetically secured to said shell between said conduits and cooperating with said high pressure conduit to form a chamber; means for exposing the side of said diaphragm opposite said chamber to atmospheric pressure; a bellows hermetically secured to said shell and to said diaphragm; an elastic material within said bellows, said elastic material having a passage therethrough, said passage communicating between said high pressure conduit and said shell; a tubular member secured within said bellows and having a portion thereof hermetically slidable within said high pressure conduit; and means for transmitting pressure from said low pressure conduit to said chamber to compress said elastic material and restrict the passage therethrough.

5. In a pressure regulator: a shell; a high and a low pressure conduit connected to said shell; an elastic filler member having one end secured within said shell, said filler having a passage, said passage communicating between said high and low pressure conduits; a diaphragm centrally secured to said filler and peripherally secured between said shell and said high pressure conduit; tubular means slidable hermetically within said high pressure conduit and secured centrally of said diaphragm; means relatively nonyieldable laterally and longitudinally compressible surrounding said filler; a spring urging said diaphragm upstream; means for adjusting said spring; pressure equalizing means between the upstream side of said diaphragm and said shell, the downstream side of said diaphragm being exposed to atmospheric pressure.

6. In a pressure regulator: high and low pressure conduits; a shell connected between said high said low pressure conduits; a diaphragm hermetically secured to said shell between said conduits, said diaphragm and said high pressure conduit forming a chamber therebetween, the side of said diaphragm opposite said chamber being exposed to atmospheric pressure; an elastic filler; a hood and a sleeve telescopically engaged over said filler; a tubular member secured within said filler and having a portion thereof hermetically slidable within said high pressure conduit, said filler and tubular member having a passage therethrough, said passage communicating between said high pressure conduit and said shell; and means for transmitting pressure from said low pressure conduit to said chamber to compress said filler and restrict the passage therethrough.

7. In a pressure regulator: a shell; high and low pressure conduits; an elastic filler having one end secured upon said shell; a diaphragm centrally secured to said filler and peripherally secured between said shell and said high pressure conduit; a support plate for said diaphragm; tubular conduit means slidable hermetically within said high pressure conduit and secured centrally of said diaphragm, said filler, plate, and diaphragm having a continuous passage therethrough, said passage communicating between said high and low pressure conduits; means substantially laterally unyieldable and longitudinally compressible enclosing said filler; means normally flexing said diaphragm upstream; means exposing the downstream side of said diaphragm to atmospheric pressure; and pressure equalizing means between the upstream side of said diaphragm and said shell.

8. In a pressure regulator: a shell; a sleeve secured therein; an elastic filler having one end secured within said sleeve; a hood slidable over said sleeve; high and low pressure conduits; a diaphragm centrally secured to said hood and peripherally secured between said shell and said high pressure conduit; tubular means slidable hermetically within said high pressure conduit and secured centrally of said diaphragm, said filler and tubular means having a passage therethrough, said passage communicating between said high and low pressure conduits; means exposing the downstream side of said diaphragm to atmospheric pressure; and pressure equalizing means between the upstream side of said diaphragm and said shell.

9. In a pressure regulator: a high and a low pressure conduit; a diaphragm; compressible elastic filler material mounted upon said diaphragm, said diaphragm being secured between said high pressure conduit and said low pressure conduit; telescopic housing means for said elastic filler; movable hermetically sealed means between said diaphragm and said high pressure conduit, said movable hermetically sealed means, diaphragm, and filler having a passage therethrough, said passage communicating between said high and low pressure conduits; means exposing the downstream side of said diaphragm to atmospheric pressure; and means to transmit pressure from said low pressure conduit to the upstream side of said diaphragm to compress said filler and restrict said passage.

10. As an article of manufacture, a unit comprising: a diaphragm, a support plate for said diaphragm, a bellows, and a filler attached to said diaphragm and encased within said bellows, said unit having a passage therethrough adapted to be gradually restricted and finally closed as said diaphragm is flexed to compress said bellows and filler.

11. As an article of manufacture, a unit comprising: a diaphragm, a support plate for said diaphragm, an elastic filler housed within a substantially laterally unexpansible and longitudinally yieldable means, and a tubular member carried by said diaphragm, said unit having a passage therethrough adapted to be gradually restricted and finally closed as said diaphragm is flexed to compress said filler.

12. A fluid flow control means comprising a high pressure conduit; a low pressure conduit; an elastic mass having a passage therethrough communicating with both said high pressure conduit and said low pressure conduit; and means connected to said elastic mass and operative in response to the pressure in one of said conduits to apply compressive force to said elastic mass in the direction of the axis of said passage while restraining deformation of said mass radially of the passage outwardly, whereby the effective cross-sectional area of said passage may be varied in response to the pressure in one of said conduits.

ALEXANDER BOYNTON.

REFERENCES CITED

The following references are of record in the file of this patent:

UNITED STATES PATENTS

| Number | Name | Date |
|---|---|---|
| 726,962 | Metzger | May 5, 1903 |
| 1,517,485 | Badowski | Dec. 2, 1924 |
| 1,657,663 | Devereux | Jan. 31, 1928 |
| 1,905,583 | Giesler | Apr. 25, 1933 |
| 2,025,247 | Rosenberger | Dec. 24, 1935 |
| 2,341,525 | Boynton | Feb. 15, 1944 |